United States Patent
Thanayankizil et al.

(10) Patent No.: US 10,321,508 B2
(45) Date of Patent: Jun. 11, 2019

(54) ESTABLISHING SHORT RANGE WIRELESS COMMUNICATION BETWEEN A VEHICLE AND A MOBILE DEVICE

(71) Applicant: GM Global Technology Operations LLC, Detroit, MI (US)

(72) Inventors: Lakshmi V. Thanayankizil, Rochester Hills, MI (US); David P. Pop, Garden City, MI (US); Fan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 14/702,429

(22) Filed: May 1, 2015

(65) Prior Publication Data

US 2016/0323921 A1 Nov. 3, 2016

(51) Int. Cl.
| | | |
|---|---|---|
| H04W 76/19 | (2018.01) | |
| H04W 4/80 | (2018.01) | |
| H04W 76/14 | (2018.01) | |
| H04W 84/12 | (2009.01) | |
| H04W 84/18 | (2009.01) | |

(52) U.S. Cl.
CPC .......... *H04W 76/19* (2018.02); *H04W 4/80* (2018.02); *H04W 76/14* (2018.02); *H04W 84/12* (2013.01); *H04W 84/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,453,844 | B1* | 11/2008 | Lee ................. | H04W 72/08 370/329 |
| 2008/0311912 | A1* | 12/2008 | Balasubramanian ....... | H04W 48/18 455/436 |
| 2012/0106475 | A1* | 5/2012 | Jung ................ | H04W 72/121 370/329 |
| 2013/0029599 | A1* | 1/2013 | Santori ............. | G06F 13/385 455/41.2 |
| 2014/0018000 | A1* | 1/2014 | Seymour ............ | H04W 48/16 455/41.2 |
| 2014/0031010 | A1* | 1/2014 | Wuergler ........... | H04W 76/10 455/411 |
| 2016/0080708 | A1* | 3/2016 | Urata ............... | H04N 9/3147 348/744 |

* cited by examiner

*Primary Examiner* — Zhitong Chen
(74) *Attorney, Agent, or Firm* — Reising Ethington P.C.; David Willoughby

(57) ABSTRACT

A mobile communication system and a method of establishing short range wireless communication (SRWC) between a vehicle and a mobile device. The method includes: establishing a first short range wireless communication (SRWC) link between the vehicle and a first mobile device; receiving at the vehicle a request to establish a second SRWC link from a second mobile device; and disconnecting the first SRWC link between the vehicle and the first mobile device and, in response to the request, establishing the second SRWC link between the vehicle and the second mobile device.

10 Claims, 2 Drawing Sheets

200

ESTABLISHING SHORT RANGE WIRELESS COMMUNICATION BETWEEN A VEHICLE AND A MOBILE DEVICE

TECHNICAL FIELD

The present invention relates to establishing short range wireless communication between a vehicle and a mobile device.

BACKGROUND

Cellular telephones (e.g., Smart phones) may communicate with modern vehicles according to short range and cellular protocols, e.g., where the vehicle is equipped with wireless and/or telematics equipment. In some instances, two or more mobile devices may attempt to connect with the vehicle over different protocols and the vehicle equipment may not be able to manage the requests due to the differing nature of the protocols or other such criteria. Thus, there is a need to provide a vehicle having the ability to establish communication with multiple mobile devices according to different wireless protocols.

SUMMARY

According to an embodiment of the invention, there is provided a method of establishing short range wireless communication (SRWC) between a vehicle and a mobile device. The method includes: establishing a first short range wireless communication (SRWC) link between the vehicle and a first mobile device; receiving at the vehicle a request to establish a second SRWC link from a second mobile device; and disconnecting the first SRWC link between the vehicle and the first mobile device and, in response to the request, establishing the second SRWC link between the vehicle and the second mobile device.

According to an embodiment of the invention, there is provided a method of establishing short range wireless communication (SRWC) between a vehicle and two mobile devices, a first mobile device and a second mobile device. The method includes: receiving at the vehicle a short range wireless communication (SRWC) link request from the second mobile device while the vehicle and the first mobile device have an established first SRWC link over a first channel; temporarily terminating the first SRWC link and establishing a second SRWC link between the vehicle and the second mobile device over the first channel; and re-establishing the first SRWC link between the vehicle and the first mobile device over a second channel.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The communication system and method described below pertains to interactions between a vehicle electronics device, e.g., such as a vehicle head unit and at least two mobile devices. The head unit and mobile devices are capable of communicating over a short range wireless communication (SRWC) protocol. The head unit may have at least two SRWC transceivers associated with two different communication channels. The configuration of the head unit may enable a channel switching operation which disconnects a first mobile device on a first channel (already connected) and subsequently connects a second mobile device to the first channel. In addition, the first mobile device then is reconnected over a second channel so that any communications between the first mobile device and the head unit are only temporarily disabled.

The channel switching operation can be desirable where the second mobile device attempts to communicate according to a SRWC protocol that requires a particular protocol communication parameter enabling functionality over the first channel, but not over via the second channel. One example of such a parameter is transmission frequency; e.g., the head unit may be configured so that the first channel may operate at a higher frequency than the second channel. Further, while some SRWC protocols may operate at both higher and lower frequencies (e.g., 802.11 protocols such as Wi-Fi operating at 2.4 GHz and 5 GHz), others may not operate at both (e.g., Wi-Fi Direct, which operates at higher frequencies only (e.g., 5 GHz)). To further complicate matters, some mobile devices are configured to operate at only one frequency, whereas other mobile devices are configured to operate at both. In order to maintain compatibility with a wide variety of mobile devices, it is desirable that the head unit be configured to operate at both higher and lower frequencies. Thus, the channel switching operation enables different mobile devices to be coupled wirelessly to the head unit and communicate over a desired SRWC protocol, even when this may require switching the channels of at least one of the mobile devices. In at least one embodiment, the channel switching operation is automated to improve the user experience.

Communications System—

Figure 1:
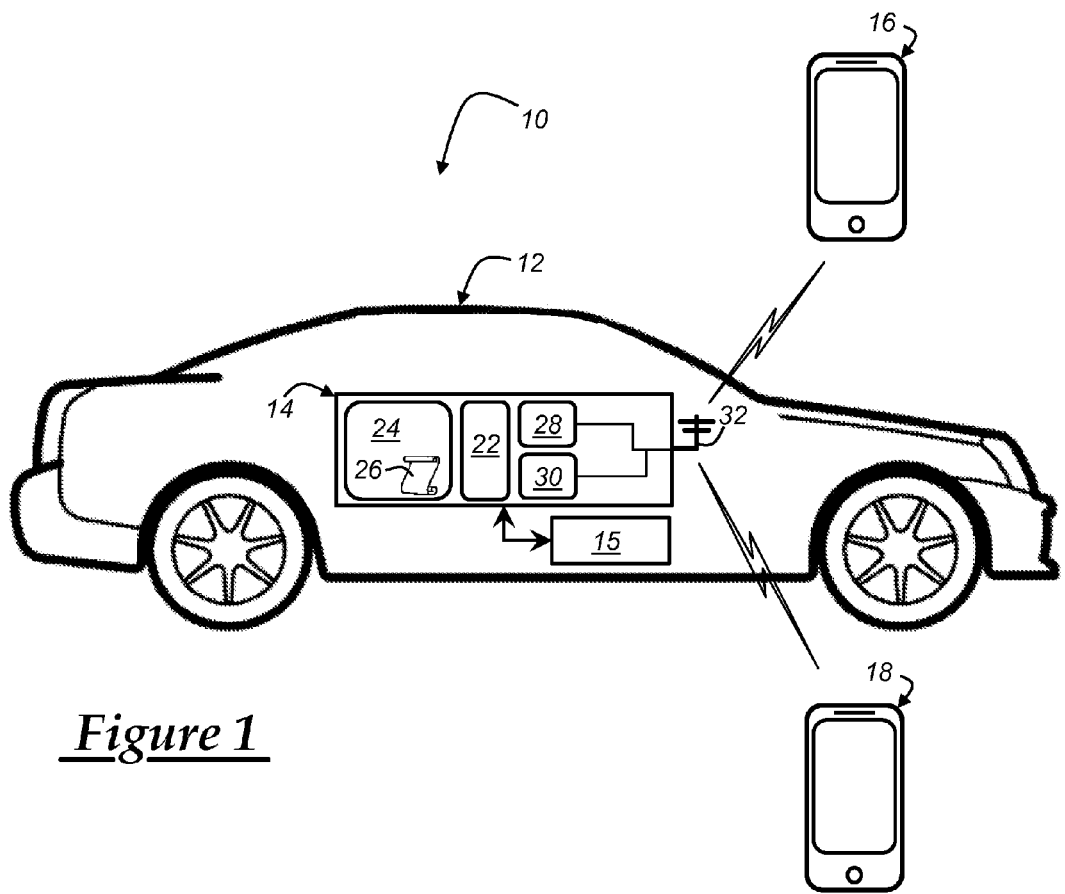
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12 having a vehicle infotainment system (VIS) or head unit 14 and two or more mobile devices 16, 18. It should be understood that the disclosed method can be used with any number of different systems and is not specifically limited to the operating environment shown here. Thus, the following paragraphs simply provide a brief overview of one such communications system 10; however, other systems (not shown here) could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 12 may include a variety of vehicle electronic devices and equipment (some of which are not illustrated); one such device may be VIS 14. Another electronic device may include a telematics unit 15 for performing cellular and other wireless communications, as well as performing a number of other vehicle services. Other electronic devices (not shown) may include microphone(s), pushbutton(s) and other control inputs, one or more visual displays, an audio system, and a number of vehicle system modules (VSMs) for controlling or regulating various vehicle subsystems, just to name a few examples. These electronic devices, as well as VIS 14, may be interconnected or electrically coupled by one or more wired or wireless communication networks. For example, in some implementations, telematics unit 15 may be electrically coupled to VIS 14 thereby facilitating receipt of long range or cellular information (via the telematics unit) which then may be conveyed or communicated to occupants or users of vehicle 12.

Vehicle infotainment system (VIS) 14 may be any suitable entertainment or infotainment device which may be embedded in vehicle 12. Although not shown, VIS 14 may include a display and user-interface, as well as be part of a vehicle audio system (e.g., including speakers and/or microphone(s)). VIS 14 is shown having one or more processors 22 coupled to memory 24 (which may have one or more software applications 26 stored thereon) and two short range wireless transceivers 28, 30 each coupled to at least one antenna 32.

Processor(s) 22 can be any type of device capable of processing electronic instructions including microprocessors, microcontrollers, host processors, controllers, vehicle communication processors, and application specific integrated circuits (ASICs). It can be a dedicated processor used only for VIS 14 or can be shared with other vehicle systems and electronic devices. Processor(s) 22 execute various types of digitally-stored instructions 26 which may include the software or firmware programs stored in memory 24 or instructions stored on the processor itself. In at least one implementation, the instructions are configured to perform the channel switching operation discussed above and thus, carry out at least a part of the method discussed herein.

The memory 24 may include any suitable non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Transceivers (or radios) 28, 30 may include any suitable communication circuitry (including one or more wireless chipsets). In at least one implementation, transceiver 28 and transceiver 30 include different short range wireless communication (SRWC) chipsets (or a single chipset configured for different types of SRWC). Thus, while the VIS 14 may have a single service set identifier (SSID), it may have two or more different media access control (MAC) addresses—one for each transceiver 28, 30. SRWC include establishing connections or links via any suitable short range wireless protocol; non-limiting examples of SRWC protocols include Wi-Fi, Wi-Fi Direct, Bluetooth, Bluetooth Low Energy (BLE), Near-Field Communication (NFC), just to name a few. In one embodiment, transceiver 28 operates at a 2.4 Gigahertz (GHz) frequency and transceiver 30 operates at a 5 GHz frequency. Skilled artisans will appreciate that these two frequencies are part of two standards which are presently in use. Thus, it is contemplated that additional frequencies may used now, or in the future; and thus, these two frequencies are merely examples. For example, the 5 GHz frequency is used with both 802.11 protocols (e.g., for Wi-Fi) as well as newer protocols such as Wi-Fi Direct. And the 2.4 GHz frequency is not used with Wi-Fi Direct, but can be used with 802.11 protocols. In other embodiments, VIS 14 may have three or more transceivers—and the frequencies of such transceivers may be the same or differ from the frequencies of transceivers 28, 30. The transceivers 28, 30 may be coupled to be the processor(s) 22, memory 24, and/or one or more antennas 32.

Mobile devices 16 and 18 may be identical; therefore only mobile device 16 will be described and it will be appreciated that the following description may apply equally to mobile device 18. Mobile device 16 could be any electronic device capable of cellular voice and/or data calls across a wide geographic area where transmissions are facilitated by a wireless carrier system (e.g., according to a cellular service agreement). In other implementations, mobile device 16 could be any electronic device capable of short range wireless communication (SRWC) (e.g., Wi-Fi, Wi-Fi Direct, Bluetooth, Bluetooth Low Energy (BLE), Near-Field Communication (NFC), etc.) with other devices such as VIS 14. Of course, some mobile devices 16 may have both cellular and SRWC capabilities.

Mobile device 16 may include a number of non-illustrated features, including a user interface, display, one or more wireless transceivers (e.g., for SRWC and/or cellular communication), a processor, memory devices, etc. Non-limiting examples of the mobile device 16 include a cellular telephone, a personal digital assistant (PDA), a Smart phone, a personal laptop computer or tablet computer having two-way communication capabilities, a netbook computer, or a notebook computer. The mobile device 16 may be used inside or outside of vehicle 12 by the vehicle user who may be a vehicle driver or passenger. It should be appreciated that the user does not need to have ownership of the mobile device 16 or the vehicle 12 (e.g., the vehicle user may be an owner or a licensee of either or both). And in FIG. 1, both mobile devices 16, 18 are shown in SRWC with VIS 14.

Method—

Figure 2:
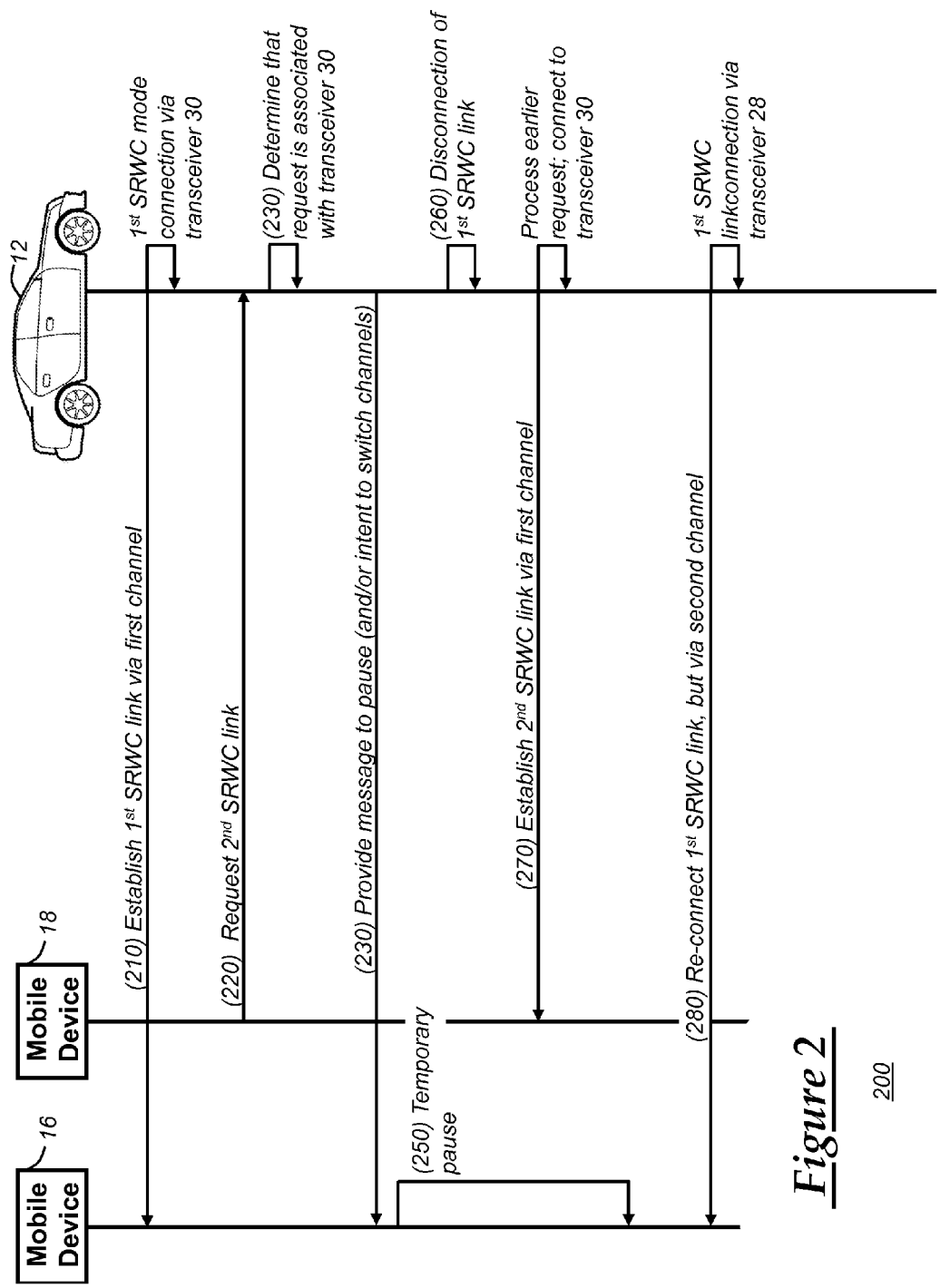
FIG. 2 is flow diagram illustrating an embodiment using the communication system of FIG. 1.

Turning now to FIG. 2, there is shown a method 200 of establishing short range wireless communication (SRWC) between vehicle 12 (e.g., VIS 14) and the two mobile devices 16, 18. As discussed above, method 200 describes a channel switching operation which disconnects a first mobile device 16 from vehicle 12 (communicating over a first SRWC channel) and subsequently connects a second mobile device 18 to the first channel. The method includes re-connecting the first mobile device 16, but this time, over a second SRWC channel. Thus, any communications between the first mobile device 16 and vehicle 12 are only temporarily disabled.

Method 200 begins with step 210—establishing a first SRWC link between mobile device 16 and VIS 14. In at least one embodiment, VIS 14 may connect with mobile device 16 using transceiver 30 (e.g., coupled via MAC address T5, a 5 GHz transceiver) over a first channel (i.e., a 5 GHz channel). Therefore, mobile device 16 may experience generally faster data transmission therebetween. In some embodiments, when both transceivers 28 and 30 are unused (or available), VIS 14 will select the transceiver having faster transmission capability, provided the mobile device is configured to communicate at that frequency. In at least one implementation, mobile device 16 and VIS 14 establish a Wi-Fi connection. After step 210, the method proceeds to step 220.

In step 220, VIS 14 receives a request from mobile device 18 to establish a second SRWC link. In at least one implementation, the request requires a frequency (or corresponding data transmission speed) that is higher than the available transceiver (i.e., transceiver 28, which is currently not in use; and e.g., transceiver 28 could be a 2.4 GHz transceiver). Step 230 follows.

In step 230, VIS 14 determines that mobile device 18 needs to use transceiver 30 and the first channel (e.g., at 5

GHz). This determination may be made using logic instructions 26 (e.g., stored in memory 24), and may be based, at least in part, on using information provided in the request of step 220 (e.g., in header data). After step 230, method 200 proceeds to step 240.

In step 240, VIS 14 provides any suitable indication (e.g., a message) to mobile device 16 (e.g., over the first channel) of a need to temporarily pause communications in response to receiving the request. The length or duration of the temporary pause may be determined by VIS 14 using application software 26; in other implementations, the duration may be a predetermined value stored in memory 24. In addition, this indication further may include an intent to change or switch channels (e.g., from the first channel to a second channel (e.g., a 2.4 GHz channel)). In one embodiment, the intent to change channels may utilize an extended channel switch announcement (ECSA). The ESCA, as will be appreciated by skilled artisans, may be a mechanism for VIS 14 to notify the mobile device 16 (which is already connected) of its intention to change channels, to change channel bandwidth, and the like. Further, the duration of the temporary pause may be included in the ECSA. Step 250 follows.

In step 250, mobile device 16 pauses communications with VIS 14 in response to receiving the indication in step 240. As illustrated, this pause may be of sufficient duration to perform steps 260 and 270. The method then proceeds to step 260.

In step 260, VIS 14 disconnects with mobile device 16 (e.g., disconnects the Wi-Fi session) thus making the first channel available to mobile device 18. Mobile device 16 may not be aware of this disconnection. Alternatively, mobile device 16 may be awaiting a re-connection request or indication from VIS 14. Step 270 follows.

In step 270, a second SRWC link is established between VIS 14 and mobile device 18 using transceiver 30 (MAC address T5) and over the first channel (e.g., over the 5 GHz channel). In some embodiments, VIS 14 retained the request in step 220 in memory or a queue; e.g., until the first channel was available. In at least one embodiment, the request in step 220 and the subsequent established connection in step 270 enable mobile device 18 to utilize a Wi-Fi Direct protocol. Using Wi-Fi Direct, mobile device 18 may execute phone projection techniques (e.g., Miracast™) between it and VIS 14, which otherwise may not be available via a Wi-FI connection. The method then proceeds to step 280.

In step 280, VIS 14 and mobile device 16 re-connect the first SRWC link (e.g., Wi-Fi); however, this time, the link is via transceiver 28 (e.g., coupled via MAC address T2.4, a 2.4 GHz transceiver) and over a second channel (e.g., a 2.4 GHz channel). In some implementations, mobile device 16 may initiate the re-connection (e.g., automatically following the temporary pause duration); in other implementations, VIS 14 may initiate the re-connection following the pause duration, or even before the end of the pause duration.

Following step 280, method 200 ends having performed the channel switching operation and having established connections for both mobile devices 16, 18. Thus, following step 280, mobile device 16 may communicate via the second channel (e.g., sending data to and/or receiving data from VIS 14—e.g., via Wi-Fi), and mobile device 18 may communicate via the first channel (e.g., sending data to and/or receiving data from VIS 14—e.g., via Wi-Fi Direct).

Other embodiments are also possible. For example, any suitable vehicle electronics device could be used instead of or in combination with VIS 14. For example, telematics unit 15 could be configured to establish the first and second SRWC links instead (and/or perform any other steps of the channel switching operation). In some instances, telematics unit may be an intermediary device—e.g., between mobile devices 16, 18 and VIS 14 and method 200 is otherwise carried out as described.

Other implementations may include a VIS 14 which comprises a single transceiver (e.g., transceiver 30)—which is described above (e.g., MAC address is T5, a 5 GHz transceiver). When mobile device 18 sends a request to connect to a protocol such as Wi-Fi Direct, mobile device 16 is simply disconnected. In these instances, mobile device 16 may re-connect, but only according to Wi-Fi Direct—of course, if this is desirable to the user and mobile device 16 is configured to communicate over Wi-Fi Direct. In this instance, the user of mobile device 16 may need to perform the re-connection manually.

Thus there has been disclosed a communication system that includes a vehicle and multiple mobile devices and a method of performing a channel switching operation at the vehicle. The channel switching operation switches a connected first device to another channel when a second device requests connection according to a different protocol. The operation further may re-connect the first device to another channel.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing short range wireless communication (SRWC) between a vehicle and a mobile device, comprising the steps of:

establishing a first short range wireless communication (SRWC) link between a first transceiver of the vehicle and a first mobile device over a first frequency band, wherein the first SRWC link uses a first SRWC protocol;

receiving at the vehicle a request to establish a second SRWC link over the first frequency band from a second mobile device during a period when the first SRWC link between the vehicle and the first mobile device is active, wherein the second SRWC link uses a second SRWC protocol that is different from the first SRWC protocol and that requires a transmission frequency corresponding to the first frequency band;

determining that the second SRWC link is to be established using the transmission frequency at the first transceiver of the vehicle based on identifying that the second SRWC protocol requires the transmission frequency corresponding to the first frequency band;
in response to receiving the request from the second mobile device and in response to the determination that the second SRWC link is to be established using the transmission frequency at the first transceiver of the vehicle, obtaining a pause communications indication, wherein the pause communications indication specifies an amount of time to pause communications over the first SRWC link between the first transceiver and the first mobile device, and wherein the amount of time to pause the communications over the first SRWC link between the first transceiver and the first mobile device is determined based on recalling a predetermined value from memory of vehicle electronics of the vehicle;
after obtaining the pause communications indication, providing the pause communications indication to the first mobile device and providing an indication of an intent to change frequency bands to the first mobile device, wherein the first mobile device is configured to pause transmissions to the vehicle over the first SRWC link for the amount of time specified in the pause communications indication in response to receiving the pause communications indication;
disconnecting the first SRWC link between the first transceiver of the vehicle and the first mobile device and, in response to the request and after disconnecting the first SRWC link between the first transceiver of the vehicle and the first mobile device, establishing the second SRWC link between the first transceiver of the vehicle and the second mobile device over the first frequency band; and
during a period when the second SRWC link between the vehicle and the second mobile device is active, re-establishing the first SRWC link between a second transceiver of the vehicle and the first mobile device using a second frequency band according to the first SRWC protocol, wherein the first frequency band is different from the second frequency band, wherein the first SRWC protocol is operable at the first frequency band and at the second frequency band, the first SRWC protocol operating according to an Institute of Electrical and Electronics Engineers (IEEE) 802.11 standard.

2. The method of claim 1, wherein the first and second mobile devices establish the first and second SRWC links, respectively, with a vehicle infotainment system (VIS).

3. The method of claim 1, wherein the first and second mobile devices establish the first and second SRWC links, respectively, using a vehicle telematics unit.

4. The method of claim 1, wherein the vehicle includes the first transceiver and the second transceiver.

5. The method of claim 4, wherein the first transceiver is configured for 2.4 Gigahertz (GHz) communication and the second transceiver is configured for 5 GHz communication.

6. The method of claim 1, wherein establishing the first SRWC link between the vehicle and the first mobile device is according to a 5 Gigahertz (GHz) frequency band and re-establishing the first SRWC link between the vehicle and the first mobile device is according to a 2.4 GHz frequency band.

7. A method of establishing short range wireless communication (SRWC) between a vehicle and a mobile device, comprising the steps of:

establishing a first short range wireless communication (SRWC) link between the vehicle and a first mobile device using a first transceiver of the vehicle over a 5 Gigahertz (GHz) frequency band;
receiving at the vehicle from a second mobile device a request to establish a second SRWC link using a Wi-Fi direct protocol during a period when the first SRWC link between the vehicle and the first mobile device using the first transceiver of the vehicle over the 5 GHz frequency band is active, wherein the Wi-Fi direct protocol as implemented by the second mobile device requires use of the 5 GHz frequency band for wireless communications;
during the period when the first SRWC link between the vehicle and the first mobile device using the first transceiver of the vehicle over the 5 GHz frequency band is active, determining that the second mobile device needs to use the 5 GHz frequency band;
after receiving the request and in response to the determining step, disconnecting the first SRWC link between the vehicle and the first mobile device by providing a pause communications indicator that specifies an amount of time to pause communications over the first SRWC link between the first mobile device and the vehicle, and, in response to the request, establishing the second SRWC link between the first transceiver of the vehicle and the second mobile device using the Wi-Fi direct protocol over the 5 GHz frequency band; and
after receiving the request to establish the second SRWC link using the Wi-Fi direct protocol, establishing the first SRWC link between the vehicle and the first mobile device using a second transceiver of the vehicle over a 2.4 GHz frequency band.

8. The method of claim 7, wherein the request is a phone projection request.

9. A method of establishing short range wireless communication (SRWC) between a vehicle and two mobile devices, a first mobile device and a second mobile device, comprising the steps of:

receiving at the vehicle a short range wireless communication (SRWC) link request from the second mobile device to establish a second SRWC link over the first channel while the vehicle and the first mobile device have an established first SRWC link over a first channel, wherein the first SRWC link uses a first SRWC protocol;
determining that the second SRWC link requires a transmission frequency corresponding to the first channel based at least partly on information received in the connection request;
in response to the determination, temporarily terminating the first SRWC link by providing a pause communications indicator that specifies an amount of time to pause communications over the first SRWC link between the first mobile device and the vehicle, and establishing the second SRWC link between the vehicle and the second mobile device over the first channel; and
re-establishing the first SRWC link between the vehicle and the first mobile device over a second channel using the first SRWC protocol.

10. The method of claim 9, wherein the first and second SRWC links are between the two mobile devices and a vehicle infotainment system (VIS).

* * * * *